(12) United States Patent
Heinemann et al.

(10) Patent No.: US 6,306,920 B1
(45) Date of Patent: Oct. 23, 2001

(54) METHOD FOR PRODUCING CLOSED-CELL RIGID POLYURETHANE FOAMS HAVING LOW THERMAL CONDUCTIVITY

(75) Inventors: Torsten Heinemann, Siegburg; Werner Dietrich, Odenthal; Walter Klän, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/424,093

(22) PCT Filed: May 22, 1998

(86) PCT No.: PCT/EP98/03039

§ 371 Date: Nov. 18, 1999

§ 102(e) Date: Nov. 18, 1999

(87) PCT Pub. No.: WO98/55528

PCT Pub. Date: Dec. 10, 1998

(30) Foreign Application Priority Data

Jun. 3, 1997 (DE) .............................................. 197 23 193

(51) Int. Cl.$^7$ ...................................................... C08J 9/14
(52) U.S. Cl. .......................... 521/174; 521/129; 521/131; 521/164; 521/167; 521/170
(58) Field of Search .................................. 521/129, 131, 521/164, 167, 170, 174

(56) References Cited

U.S. PATENT DOCUMENTS 4,931,482   6/1990   Lamberts et al. .................... 521/131
5,096,933   3/1992   Volkert ................................. 521/131
5,272,183   12/1993  Doerge ................................. 521/131
5,523,334 * 6/1996   White, III et al. .................. 521/131
5,684,057 * 11/1997  White, III et al. .................. 521/131

OTHER PUBLICATIONS

Nature, vol. 249, Jun. 28, 1974, Mario J. Molina & F. S. Rowland. Stratospheric sink for chlorofluoromethanes: chlorine atomc–atalysed destruction of ozone, pp. 810–812.

* cited by examiner

Primary Examiner—John M. Cooney, Jr.
(74) Attorney, Agent, or Firm—Joseph C. Gil; Carolyn M. Sloane

(57) ABSTRACT

Closed cell rigid polyurethane foams are produced by reacting a) a polyol component with b) a polyisocyanate having an NCO content of from about 20 to about 48% by weight. The polyol component a) includes: 1) from 40 to 80% by weight, based on the total weight of polyol component a), of a sucrose or sorbitol initiated polyether having a molecular weight of from about 300 to about 800; 2) from 3 to 40% by weight, based on the total weight of polyol component a), of an aromatic amine initiated polyether having a molecular weight of from about 300 to about 800; 3) from 3 to 40% by weight, based on the total weight of polyol component a), of an aliphatic amine initiated polyether having a molecular weight of from about 200 to about 800; 4) from 3 to 40% by weight, based on the total weight of polyol component a), of a linear polyether having a molecular weight of from about 500 to about 1500; optionally, 5) other compounds containing at least isocyanate-reactive hydrogen atoms having a molecular weight of from about 150 to about 12,500; 6) a catalyst; 7) water; 8) a foaming agent; and optionally, 9) a processing aid and/or additive.

12 Claims, No Drawings

METHOD FOR PRODUCING CLOSED-CELL RIGID POLYURETHANE FOAMS HAVING LOW THERMAL CONDUCTIVITY

On account of their low thermal conductivity, polyurethane rigid foamed materials are employed for the insulation of refrigeration and freezing appliances, of industrial installations, of tank farms and pipelines, and in shipbuilding and in the construction industry. A summarised review of the production of polyurethane rigid foamed materials and their use is given in the Kunststoff-Handbuch, Volume 7 (Polyurethanes), 2nd Edition 1983, edited by Dr. Günter Oertel (Carl Hanser Verlag, Munich).

The thermal conductivity of a substantially closed cell polyurethane rigid foamed material depends to a considerable extent on the type of foaming agent or cell gas used. Fully halogenated chlorofluorocarbons (CFCs) have proved to be particularly suitable for this purpose, particularly trichlorofluoromethane (R11), which has a particularly low thermal conductivity. These substances are chemically inert and nontoxic. On account of their high stability, however, fully halogenated chlorofluorocarbons enter the stratosphere, where they contribute to the destruction of the ozone which is present there due to their chlorine content (Molina, Rowland, Nature 249 (1974) 810).

As a replacement for chlorofluorocarbons, the use of hydrofluoroalkanes such as R141b (dichlorofluoroethane) as foaming agents has been proposed (U.S. Pat. No. 5,272,183).

The use of partially fluorinated hydrocarbons (hydrofluoroalkanes) as foaming agents, which still contain at least one carbon-hydrogen bond, has also been proposed (EP 344 537, U.S. Pat. No. 4,931,482). Substances of this class of compounds contain no chlorine atoms and consequently have an ODP value (ozone depletion potential) of zero (by comparison, R11has an ODP of 1). Typical representatives of this class of substances are, for example, 1,1,1,4,4,4-hexafluorobutane (R356) and 1,1,1,3,3-pentafluoropropane (245fa).

In addition, the use of cyclopentane, or cyclopentane in admixture with other alkanes, such as i-butane, n-butane, n-pentane or isopentane, as foaming agents is known from EP 0 421 269.

Depending on the foaming agent used, the polyol formulation has to be modified in order to obtain polyurethane rigid foamed materials of comparable, low thermal conductivity. Polyol formulations would therefore be desirable which would result in rigid foamed materials of similar thermal conductivity when different foaming agent systems are used, without changes in the formulation or changes in the mechanical equipment parameters for the foaming formulation becoming necessary, which are disadvantageous for reasons of cost.

The object of the present invention was therefore to identify a method of producing closed cell polyurethane rigid foamed materials of low thermal conductivity, with which polyurethane rigid foamed materials having a similar, low thermal conductivity can be obtained even when different foaming agent systems are used.

Surprisingly, polyol formulations have now been found which can be foamed using all the aforementioned replacement substances for chlorofluorocarbons, particularly cyclopentane, cyclopentane/i-butane mixtures, cyclopentane/i-pentane mixtures, R 141b and R 245 fa, and which always result in polyurethane rigid foamed materials which have a similar, low thermal conductivity and an outstanding spectrum of properties, and which are particularly suitable for the insulation of refrigeration and freezing appliances. This is particularly advantageous for the processor of such formulations, since on a possible change of foaming agent, e.g. for legal reasons, no special adaptation of mechanical equipment parameters and no change in stockholding is necessary, and a change of foaming agent can thus be made rapidly and costeffectively.

The present invention relates to a method of producing closed cell polyurethane rigid foamed materials having a low thermal conductivity from polyols and polyisocyanates and from foaming agents and optionally from foaming aids, characterised in that the polyurethane rigid foamed material is obtained by the reaction of A. a polyol component containing
  (1) 40–80% by weight of a polyethylene oxide/propylene oxide polyether of molecular weight 300–800 which is based on sucrose or sorbitol,
  (2) 3–40% by weight of a polyethylene oxide/propylene oxide polyether of molecular weight 300–800 which is based on an aromatic mono-, di- or polyamine,
  (3) 3–40% by weight of a polyethylene oxide/propylene oxide polyether of molecular weight 200–800 which is based on an aliphatic mono-, di- or polyamine,
  (4) 3–40% by weight of a linear polyethylene oxide/propylene oxide polyether of molecular weight 500–1500,
  (5) optionally other compounds of molecular weight 150 to 12,500 g/mole which comprise at least two hydrogen atoms which are reactive towards isocyanates,
  (6) catalysts,
  (7) water,
  (8) foaming agents from the group comprising alkanes, cycloalkanes, hydrochlorofluorocarbons, hydrofluorocarbons, and
  (9) optionally adjuvant substances and/or additives with
B. a polyisocyanate which is optionally modified and which has an NCO content of 20 to 48% by weight.

Polyol formulations which are used according to the invention contain a compound of molecular weight 300 to 800 g/mole which comprises at least two hydrogen atoms which are reactive towards isocyanates. They are obtained by the addition polymerisation of alkylene oxides, such as ethylene oxide, propylene oxide, butylene oxide, dodecyl oxide or styrene oxide for example, preferably propylene oxide or ethylene oxides, with starter compounds. Polyhydric alcohols such as sucrose and sorbitol, as well as mixtures of these alcohols with water, glycerol, propylene glycol, ethylene glycol or diethylene glycol, are used as starter compounds. By means of these polyols which are used according to the invention, the mechanical properties of polyurethane rigid foamed materials which are usually required in practice can be obtained.

The polyol formulations which are used according to the invention additionally contain at least one compound which has a molecular weight of 300 to 800 g/mole and which comprises at least two hydrogen atoms which are reactive towards isocyanates. These compounds are obtained by the addition polymerisation of alkylene oxides, such as ethylene oxide, propylene oxide, butylene oxide, dodecyl oxide or styrene oxide for example, preferably propylene oxide or ethylene oxide, with aromatic mono-, di- or polyamines such as aniline, phenylenediamine, diaminotoluenes (2,3-diaminotoluene, 3,4-diaminotoluene, 2,4-diaminotoluene, 2,5-diaminotoluene, 2,6-diaminotoluene or mixtures of said isomers), 2,2'-diamino-diphenylmethane, 2,4'-diamino-diphenylmethane, 4,4'-diaminodiphenylmethane or mixtures of these isomers.

In addition, the polyol formulations which are used according to the invention contain at least one compound which has a molecular weight of 200 to 800 g/mole and which comprises at least two hydrogen atoms which are reactive towards isocyanates, which are obtained by the addition polymerisation of alkylene oxides, such as ethylene oxide, propylene oxide, butylene oxide, dodecyl oxide or styrene oxide for example, preferably propylene oxide or ethylene oxide, with aliphatic mono-, di- or polyamines such as ethylenediamine, oligomers of ethylenediamine (for example diethylenetriamine, triethylenetetramine or pentaethylenehexamine), ethanolamine, diethanolamine, triethanolamine, N-methyl- or N-ethyldiethanolamine, 1,3-propylenediamine, 1,3- or 1,4-butylenediamine, or 1,2-, 1,3-, 1,4-, 1,5- or 1,6-hexamethylenediamine.

The polyol formulations which are used according to the invention also contain a compound which has a molecular weight of 500 to 1500 g/mole and which contains at least two hydrogen atoms which are reactive towards isocyanates. These are obtained by the addition polymerisation of alkylene oxides, such as ethylene oxide, propylene oxide, butylene oxide, dodecyl oxide or styrene oxide for example, preferably propylene oxide or ethylene oxide, with starter compounds such as water, propylene glycol, ethylene glycol or diethylene glycol.

The catalysts which are customary in polyurethane chemistry can be used in the method according to the invention. Examples of catalysts of this type include: triethylenediamine, N,N-dimethylcyclohexylamine, tetramethylenediamine, 1-methyl4-dimethylaminoethylpiperazine, triethylamine, tributylamine, dimethylbenzylamine, N,N',N''-tris-(dimethylaminopropyl)-hexahydrotriazine, dimethylamino-propylformamide, N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo-(3,3,0)-octane, bis-(dimethylaminopropyl)-urea, N-methylmorpholine, N-ethylmorpholine, N-cyclohexylmorpholine, 2,3-dimethyl-3,4,5,6,-tetrahydropyrimidine, triethanolamine, diethanolamine, triisopropanolamine, N-methyldiethanolamine, N-ethyldiethanolamine, dimethylethanolamine, tin(II) acetate, tin(II) octoate, tin(II) ethylhexoate, tin(II) laurate, dibutyltin diacetate, dibutyltin dilaurate, dibutyltin maleate, dioctyltin diacetate, tris-(N,N-dimethyl-aminopropyl)-s-hexahydrotriazine, tetramethylammnonium hydroxide, sodium acetate, potassium acetate, sodium hydroxide, or mixtures of these or similar catalysts.

The polyol formulations which are used in the method according to the invention contain 0.5 to 7.0 parts by weight, preferably 1.0 to 3.0 parts by weight, of water per 100 parts by weight of polyol component A.

Foaming agents used according to the invention are selected from the group comprising alkanes, particularly those comprising 4 to 5 C atoms, such as i-pentane, n-pentane, n-butane, isobutane, 2,2-dimethylbutane, or cycloalkanes, particularly cyclopentane or cyclohexane, or hydrochlorofluorocarbons, preferably R 141 b (dichlorofluoroethane) or hydrofluorocarbons, preferably R 245fa, as well as mixtures thereof.

Examples of the isocyanate component include aromatic polyisocyanates, such as those described by W. Siefken in Justus Liebigs Annalen der Chemie, 562, pages 75 to 136, for example those of formula $Q(NCO)_n$, wherein n denotes 2 to 4, preferably 2, and Q denotes an aliphatic hydrocarbon radical containing 2 to 18, preferably 6 to 10, C-atoms, a cycloaliphatic hydrocarbon radical containing 4 to 15, preferably 5 to 10, C-atoms, or an aromatic hydrocarbon radical containing 8 to 15, preferably 8 to 13, C-atoms, e.g. those polyisocyanates which are described in DE-OS 28 32 253, pages 10 to 11.

Generally, polyisocyanates which are readily available commercially are particularly preferred, e.g. toluene 2,4- and 2,6-diisocyanate, as well as any mixtures of these isomers ("TDI"), polyphenylpolymethylene polyisocyanates, such as those which are produced by aniline-formaldehyde condensation and subsequent phosgenation ("crude MDI"), and "modified polyisocyanates" which contain carbodiimide groups, urethane groups, allophanate groups, isocyanurate groups, urea groups or biuret groups. Modified polyisocyanates which are derived from toluene 2,4- and 2,6-diisocyanate or from 4,4'- and/or 2,4'-diphenylmethane diisocyanate are particularly preferred.

Prepolymers of said isocyanates and organic compounds comprising at least one hydroxyl group can also be used, for example, polyol or polyester components which have a molecular weight of 60 to 1400 and which comprise 1 to 4 hydroxyl groups.

Paraffins or fatty alcohols or dimethylpolysiloxanes, as well as pigments or colorants, stabilisers against the effects of ageing and weathering, plasticisers, and substances having a fungistatic or bacteriostatic effect, can be used in conjunction, as can fillers such as barium sulphate, silaceous earth, carbon black or whitening.

Other examples of surface-active additives and foam stabilisers, as well as cell regulators, reaction retarding agents, stabilisers, flame-retardant substances, colorants and fillers, as well as substances having a fungistatic and bacteriostatic effect, and details of the method of use and mode of action of these additives, are described in the Kunststoff-Handbuch, Volume VII, edited by Vieweg and Höchtlen, Carl Hanser Verlag, Munich 1966, e.g. on pages 121 to 205, and in the 2nd Edition 1983, edited by G. Oertel (Carl Hanser Verlag, Munich).

For the production of foam, foaming is carried out according to the invention in closed moulds. In the course of this procedure, the reaction mixture is introduced into a mould. Suitable mould materials include metal, e.g. aluminium, or plastics, e.g. epoxy resin. The reaction mixture foams in the mould and forms the moulding. Foaming in the mould can be conducted so that the moulding has a cellular structure at its surface. However, it can also be conducted so that the moulding has a solid skin and a cellular core. In the first-mentioned case, the procedure according to the invention consists of introducing sufficient foamable reaction mixture into the mould so that the foamed material which is formed just fills the mould. The procedure in the latter case consists of introducing more foamable reaction mixture into the mould than is necessary for filling the interior of the mould with foam. In the latter case, "over-charging" is thus employed. A procedure of this type is known from U.S. Pat. No. 3,178,490 and U.S Pat. No. 3,182,104.

The method according to the invention is preferably used for foaming the hollow spaces of refrigeration and freezing appliances. Foamed materials can also of course be produced by block foaming or by the double conveying process which is known in the art.

The rigid foamed materials which are obtainable according to the invention are employed in the building trade and for the insulation of long-run heating pipes and containers.

The present invention also relates to the use of the rigid foamed materials produced according to the invention as an intermediate layer for composite elements and for the foaming of hollow spaces in the housings of domestic refrigerators.

The following examples serve to explain the invention, without limiting the scope thereof, however.

EXAMPLES

Raw Materials Used:

Polyol A: a polypropylene oxide/ethylene oxide polyether of molecular weight 550, based on sucrose/glycerol Polyol B: a polypropylene oxide/ethylene oxide polyether of molecular weight 560, based on a mixture of 2,3- and 2,4-diaminotoluene Polyol C: a polypropylene oxide polyether of molecular weight 540, based on ethylenediamine Polyol D: a polypropylene oxide polyether of molecular weight 900, based on propylene glycol.

A mixture according to the invention was prepared from polyethers A–D in a ratio of 50:25:15:10 (w:w:w:w). This mixture was processed, in accordance with the formulations given in the following Table, in a HK 270 high-pressure machine supplied by Hennecke at 20° C. to form polyurethane rigid foamed materials.

catalyst: dimethylcyclohexylamine (Bayer AG, Leverkusen)

silicone stabiliser: a commercially available silicone stabiliser supplied by Goldschmidt AG, Essen cyclopentane: supplied by Erdolchemie, Dormagen isobutane: supplied by Linde AG isopentane: supplied by Exxon R 141b: supplied by Solvay R 245 fa: supplied by Allied Signal isocyanate: "polymeric MDI" Desmodur® 44V20 (Bayer AG, Leverkusen).

What is claimed is:

1. A process for the production of a rigid polyurethane foam comprising reacting
    a) a polyol component comprising
        1) from about 40 to about 80% by weight, based on the total weight of polyol component a), of a polyethylene oxide/propylene oxide polyether based on sucrose or sorbitol having a number average molecular weight of from about 300 to about 800,
        2) from about 3 to about 40% by weight, based on the total weight of polyol component a), of a polyethylene oxide/polypropylene oxide polyether based on an aromatic amine having a number average molecular weight of from about 300 to about 800,
        3) from about 3 to about 40% by weight, based on the total weight of polyol component a), of a polyethylene oxide/propylene oxide polyether based on an aliphatic amine having a number average molecular weight of from about 200 to about 800,
        4) from about 3 to about 40% by weight, based on the total weight of polyol component a), of a linear polyethylene oxide/propylene oxide polyether having a number average molecular weight of from about 500 to about 1500, optionally,
        5) a compound containing at least two isocyanate-reactive hydrogen atoms having a number average molecular weight of from about 150 to about 12,500 which is not a polyether within 1), 2), 3) or 4),
        6) a catalyst,
        7) water,
        8) an alkane, cycloalkane, hydrochlorofluorocarbon or hydrofluorocarbon foaming agent, and optionally,
        9) a processing aid and/or additive with
    b) a polyisocyanate or modified polyisocyanate having an NCO content of from about 20 to about 48% by weight.

2. The process of claim 1 in which polyether 1) is a sucrose initiated polyether having a 1,2-propylene oxide content of from 70 to 100% by weight and an ethylene oxide content of from 0 to 30% by weight.

|  | Example 1 | Example 2 | Example 3 | Example 4 | Example 5 |
|---|---|---|---|---|---|
| polyol mixture | 100 | 100 | 100 | 100 | 100 |
| silicone stabiliser | 2 | 2 | 2 | 2 | 2 |
| catalyst |  |  |  |  |  |
| c-pentane | 14 |  |  |  |  |
| c-pentane/i-butane (80:20) |  | 14 |  |  |  |
| c-pentane/i-pentane (80:20) |  |  | 14 |  |  |
| R 141 b |  |  |  | 31 |  |
| R 245 fa |  |  |  |  | 28 |
| isocyanate | 142 | 142 | 142 | 142 | 142 |
| surface apparent density kg/m$^3$) | 22.0 | 21.6 | 21.0 | 21.8 | 24 |
| core apparent density kg/m$^3$) | 32.6 | 31.5 | 31.0 | 31.4 | 32 |
| thermal conductivity according to DIN 52616-77 (mW/m.K) | 20.6 | 21.4 | 21.6 | 18.5 | 19.9 |
| compressive strength according to DIN 52421-84 (MPa) | 0.15 | 0.15 | 0.15 | 0.13 | 0.16 |
| dimensional stability according to DIN 53431-77, 3 hours, −30° C.; change in dimensions in % | 0 | 0 | 0 | 0 | 0 |

Examples 1 to 5 show that when the polyol formulations according to the invention are foamed with commercially available foaming agents, rigid foamed materials are always obtained which exhibit outstanding properties which comply with what is required in practice. This is achieved with what is recognisable to one skilled in the art as a low core apparent density.

3. The process of claim 1 in which polyether 2) is an o-toluene diamine initiated polyether polyol having a 1,2-propylene oxide content of from 70 to 100% by weight and an ethylene oxide content of from 0 to 30% by weight.

4. The process of claim 1 in which polyether 3) is an ethylene diamine initiated polyether polyol having a 1,2- propylene oxide content of from 50 to 100% by weight and an ethylene oxide content of from 0 to 50% by weight.

5. The process of claim 1 in which polyether 1) is a sorbitol initiated polyether polyol having a 1,2-propylene oxide content of from 70 to 100% by weight and an ethylene oxide content of from 0 to 30% by weight.

6. The process of claim 1 in which polyether 4) is a propylene glycol initiated polyether polyol having a 1,2-propylene oxide content of from 70 to 100% by weight and an ethylene oxide content of from 0 to 30% by weight.

7. The process of claim 1 in which water 7) is present in an amount of from 0.5 to 7.0% by weight for each 100 parts by weight of polyol component a).

8. The process of claim 1 in which the foaming agent 8) is cyclopentane and/or cyclohexane.

9. The process of claim 1 in which the foaming agent 8) is a mixture composed of at least two of the following foaming agents: n-pentane, isopentane, cyclopentane and cyclohexane.

10. The process of claim 1 in which the foaming agent 8) is a mixture composed of at least two of the following foaming agents: cyclopentane, n-butane, isobutane, and 2,2-dimethylbutane.

11. The process of claim 1 in which the foaming agent 8) is n-pentane and/or isopentane.

12. The process of claim 1 in which the foaming agent 8) is 1,1,1-dichlorofluoroethane or 1,1,1,3,3-pentafluoropropane.

* * * * *